(12) United States Patent
Nagao

(10) Patent No.: US 11,073,818 B2
(45) Date of Patent: Jul. 27, 2021

(54) DEVELOPMENT SUPPORT APPARATUS, PROGRAM DEVELOPMENT SUPPORT METHOD, AND PROGRAM DEVELOPMENT SUPPORT PROGRAM

(71) Applicant: OMRON Corporation, Kyoto (JP)

(72) Inventor: Kenjiro Nagao, Kyoto (JP)

(73) Assignee: OMRON Corporation, Kyoto (JP)

( * ) Notice: Subject to any disclaimer, the term of this patent is extended or adjusted under 35 U.S.C. 154(b) by 141 days.

(21) Appl. No.: 16/326,964

(22) PCT Filed: Sep. 29, 2017

(86) PCT No.: PCT/JP2017/035404
§ 371 (c)(1),
(2) Date: Feb. 21, 2019

(87) PCT Pub. No.: WO2018/062465
PCT Pub. Date: Apr. 5, 2018

(65) Prior Publication Data
US 2019/0187667 A1   Jun. 20, 2019

(30) Foreign Application Priority Data
Sep. 30, 2016 (JP) .............................. JP2016-194881

(51) Int. Cl.
*G06F 8/34* (2018.01)
*G06F 8/41* (2018.01)
(Continued)

(52) U.S. Cl.
CPC ....... *G05B 19/4099* (2013.01); *G05B 19/056* (2013.01); *G05B 19/4097* (2013.01);
(Continued)

(58) Field of Classification Search
USPC .......................................................... 700/98
See application file for complete search history.

(56) References Cited

U.S. PATENT DOCUMENTS 6,952,811 B1 * 10/2005 Iwata .................... G05B 19/056
345/168
9,910,643 B2 * 3/2018 Udou .................. G05B 19/0426
(Continued)

FOREIGN PATENT DOCUMENTS

CN    101957745 A      1/2011
CN    104656543 A  *   5/2015
(Continued)

OTHER PUBLICATIONS

Ngalamou et al., "An Exploratory Method for Effective Deployment of Programmable Logic Controllers (PLCs)", WSEAS Transactions on Systems and Controls, Jan. 2011, pp. 1-14, vol. 6, No. 1; Relevance is indicated in the extended European search report dated Jan. 2, 2020.
(Continued)

*Primary Examiner* — Jason D Mitchell
(74) *Attorney, Agent, or Firm* — Metrolex IP Law Group, PLLC

(57) ABSTRACT

A program development support unit includes an arithmetic unit and a storage unit. A ladder diagram editing program and an edited ladder diagram program are stored in the storage unit. The arithmetic unit is configured to execute the ladder diagram editing program to edit the ladder diagram program, and store the ladder diagram program in the storage unit. The arithmetic unit is configured to allocate two-dimensional coordinates to a ladder diagram expressed by the ladder diagram program. The arithmetic unit is configured to detect two-dimensional coordinates and types of circuit elements included in the ladder diagram, and detect two-dimensional coordinates of any vertical connection lines included in the ladder diagram. The arithmetic unit is configured to store the circuit elements, the vertical connection lines, the two-dimensional coordinates of the circuit elements, and the two-dimensional coordinates of the
(Continued)

vertical connection lines in the storage unit in association with each other.

8 Claims, 5 Drawing Sheets

(51) Int. Cl.
*G05B 19/4099* (2006.01)
*G05B 19/05* (2006.01)
*G06F 8/51* (2018.01)
*G05B 19/4097* (2006.01)

(52) U.S. Cl.
CPC .............. *G06F 8/34* (2013.01); *G06F 8/4434* (2013.01); *G06F 8/51* (2013.01); *G05B 2219/36038* (2013.01)

(56) References Cited

U.S. PATENT DOCUMENTS

| | | | | |
|---|---|---|---|---|
| 10,719,643 | B2* | 7/2020 | Horikawa | G05B 19/05 |
| 2011/0295388 | A1* | 12/2011 | Iwata | G05B 19/056 |
| | | | | 700/18 |

FOREIGN PATENT DOCUMENTS

| | | |
|---|---|---|
| CN | 104820393 A | 8/2015 |
| JP | H10-283005 A | 10/1998 |
| JP | 2002-182712 A | 6/2002 |
| JP | 2003-195911 A | 7/2003 |
| JP | 2008-282260 A | 11/2008 |
| JP | 2009-265750 A | 11/2009 |
| WO | WO-2011013884 A1 * | 2/2011 ........... G05B 19/056 |

OTHER PUBLICATIONS

Extended European search report dated Jan. 2, 2020 in a counterpart European patent application.

English translation of the International Search Report of PCT/JP2017/035404 dated Oct. 31, 2017.

Written Opinion of PCT/JP2017/035404 dated Oct. 31, 2017.

Office Action (CNOA) dated Jan. 6, 2021 in a counterpart Chinese patent application.

* cited by examiner

FIG. 3

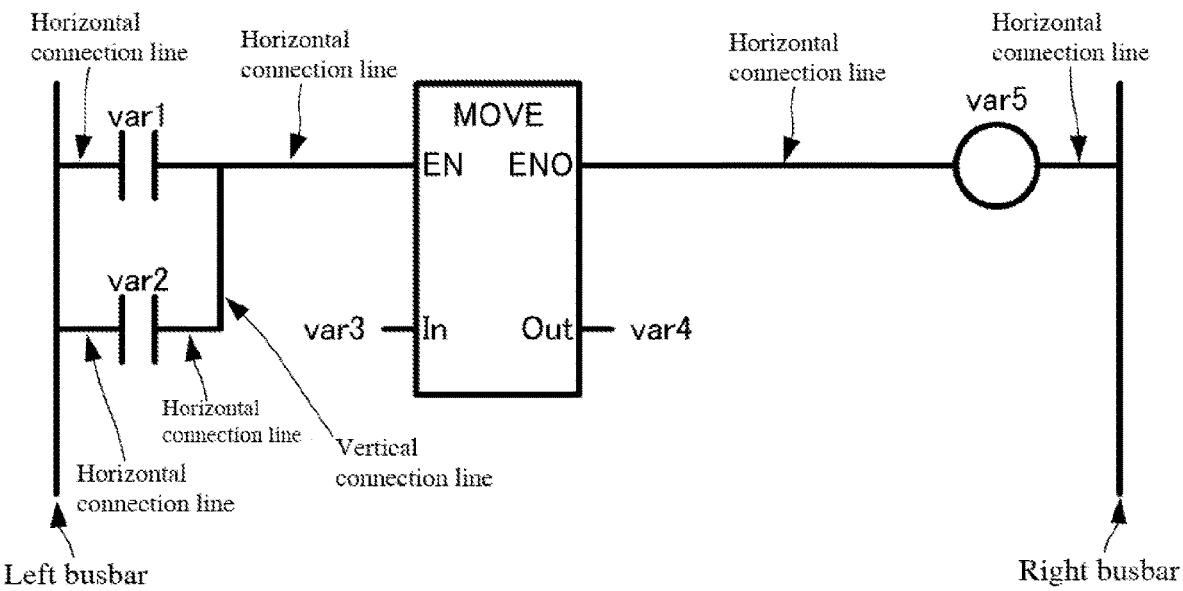

FIG. 4

```
<Cells>
  <Contact Variable="var1" X=0,Y=0 />
  <Contact Variable="var2" X=0,Y=1 />
  <Function Name="MOVE" X=1,Y=0 />
    <PowerFlowParameterType="IN"Name="EN" />
    <VariableParameterType="IN"Name="IN"Variable="var3" />
    <PowerFlowParameterType="OUT"Name="ENO" />
    <VariableParameterType="OUT"Name="OUT"Variable="var4" />
  </Function>
  <Coil Variable="var5" X=2,Y=0 />
</Cells>
<VerticalLines>
  <Line X=1 Y=0 />
</VerticalLines>
```

US 11,073,818 B2

DEVELOPMENT SUPPORT APPARATUS, PROGRAM DEVELOPMENT SUPPORT METHOD, AND PROGRAM DEVELOPMENT SUPPORT PROGRAM

TECHNICAL FIELD

The present invention relates to a technique for processing data of a ladder diagram program.

RELATED ART

Currently, various systems for automatically driving a manufacturing line or the like by controlling a plurality of devices using an industrial controller have been put to practical use. With such a system, the industrial controller controls the plurality of devices based on a ladder diagram program for automated driving.

In this case, as described in Patent Document 1, a program developer creates a ladder diagram program using a personal computer, for example. The program developer then outputs this ladder diagram program to the industrial controller from the personal computer, for example.

RELATED ART DOCUMENTS

Patent Documents

Patent Document 1: JP 2009-265750A

SUMMARY OF THE INVENTION

Problem to be Solved by the Invention

However, with a conventional configuration, all of the elements such as circuit elements, horizontal connection lines, and vertical connection points of the ladder diagram program are handled as graphic elements. Thus, the overall data volume of the ladder diagram program increases. In particular, the data volume of a complex ladder diagram program including many circuit elements and connection lines tends to significantly increase.

Thus, an object of the present invention is to provide a ladder diagram program data processing technique by which the data volume can be reduced.

Means for Solving the Problems

A program development support apparatus of this invention includes an arithmetic unit and a storage unit. A ladder diagram editing program and an edited ladder diagram program are stored in the storage unit. The arithmetic unit is configured to execute the ladder diagram editing program to edit the ladder diagram program, and store the ladder diagram program in the storage unit. The arithmetic unit is configured to allocate two-dimensional coordinates to a ladder diagram. The arithmetic unit is configured to detect two-dimensional coordinates and types of circuit elements included in the ladder diagram, and detect two-dimensional coordinates of any vertical connection lines included in the ladder diagram. The arithmetic unit is configured to store the circuit elements, the vertical connection lines, the two-dimensional coordinates of the circuit elements, and the two-dimensional coordinates of the vertical connection lines in the storage unit in association with each other.

With this configuration, the positions of the circuit elements, the positions and the lengths of the vertical connection lines, and horizontal connection lines connected to the circuit elements and the vertical connection lines in the ladder diagram are expressed by the two-dimensional coordinates of the circuit elements and the vertical connection lines. Thus, by storing only the types of circuit elements, and the two-dimensional coordinates of the circuit elements and the vertical connection lines, the ladder diagram program is restored and the data volume is further reduced than using graphic elements.

Effects of the Invention

According to this invention, it is possible to store the ladder diagram program with a reduced data volume.

BRIEF DESCRIPTION OF THE DRAWINGS

FIG. 3 is a diagram showing the original ladder diagram of the ladder diagram program shown in FIG. 2.

FIG. 4 is a diagram showing an example of data when the ladder diagram program is stored.

EMBODIMENTS OF THE INVENTION

Figure 1:
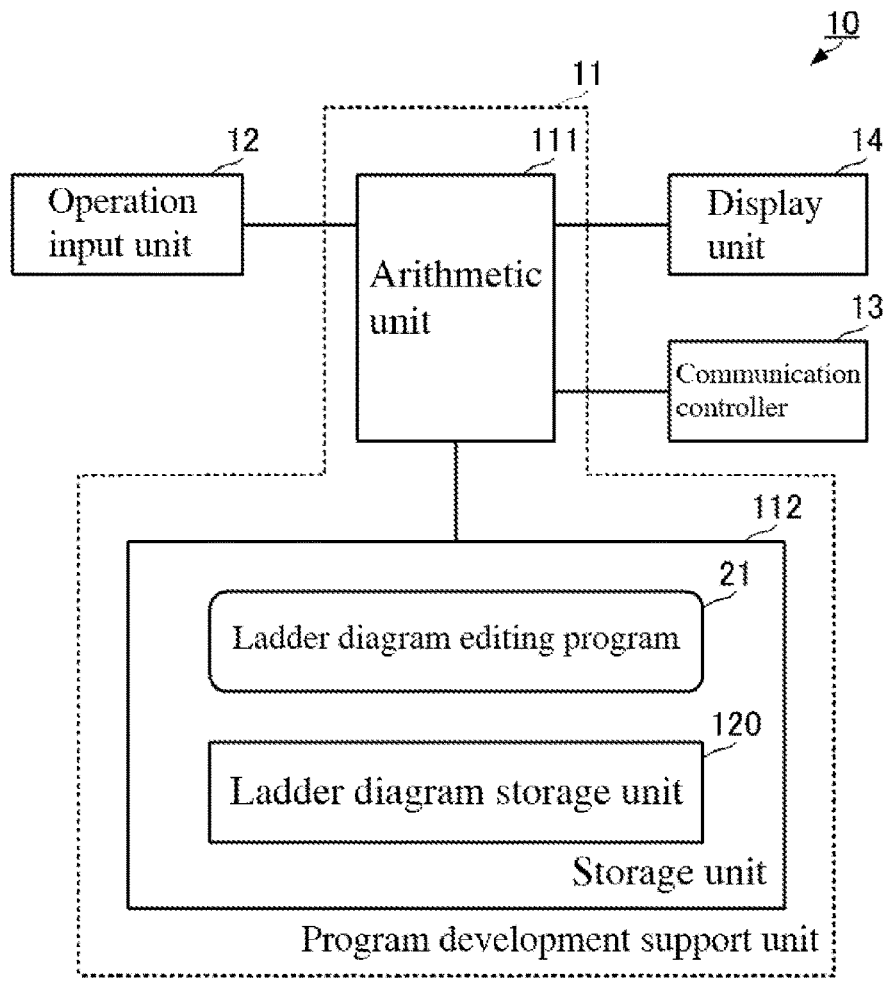
FIG. 1 is a schematic configuration diagram of a personal computer including a program development support apparatus according to an embodiment of the present invention.

A program development support technique according to an embodiment of the present invention will be described with reference to the drawings. FIG. 1 is a schematic configuration diagram of a personal computer including a program development support apparatus according to an embodiment of the present invention.

As shown in FIG. 1, a personal computer 10 includes a program development support unit 11, an operation input unit 12, a communication controller 13, and a display unit 14. Examples of the operation input unit 12 include a mouse and a keyboard, and an example of the display unit 14 is a liquid crystal display. The communication controller 13 controls communication with an industrial controller. A ladder diagram program is output to the industrial controller (not shown) via the communication controller 13. The ladder diagram program is edited by the program development support unit 11, stored in a predetermined data format, and output in this data format to the industrial controller.

The program development support unit 11 corresponds to a program development support apparatus of the present invention, and includes an arithmetic unit 111 and a storage unit 112. Various program groups including a ladder diagram editing program 21 are stored in the storage unit 112.

The arithmetic unit 111 is constituted by a CPU, for example, and executes the ladder diagram editing program 21 stored in the storage unit 112. Accordingly, a ladder diagram edit screen is displayed on the display unit 14, and a program developer edits the ladder diagram program utilizing the operation input unit 12. Upon receiving an input for performing a storage operation via the operation input unit 12 during execution of the ladder diagram editing program 21, the arithmetic unit 111 stores the edited ladder diagram program in a ladder diagram storage unit 120 of the storage unit 112. At this time, the ladder diagram program is stored in a predetermined data format obtained using a storage method described below.

Figure 2:
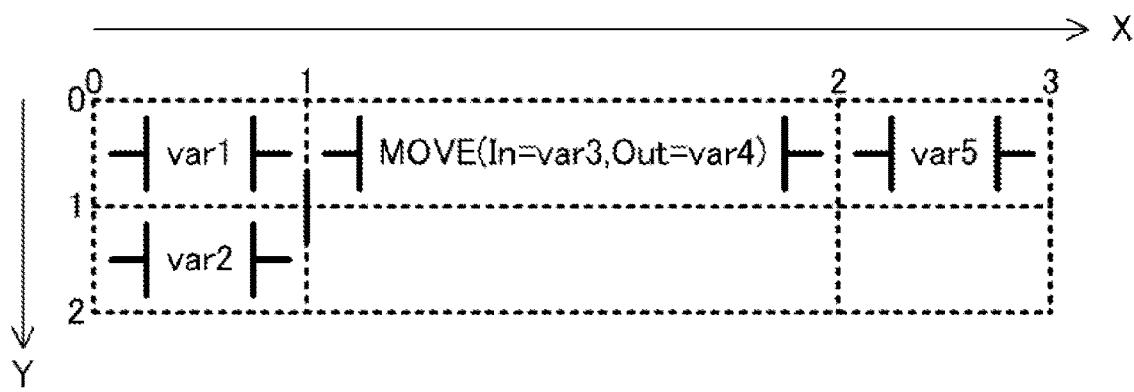
FIG. 2 is a diagram illustrating the concept of the data format when a ladder diagram program is stored.

Next, a method for storing a ladder diagram program will be described more specifically. FIG. 2 is a diagram illustrating the concept of the data format when the ladder diagram program is stored. FIG. 3 is a diagram showing the original ladder diagram of the ladder diagram program shown in FIG. 2. FIG. 4 is a diagram showing an example of data when the ladder diagram program is stored.

Although the configuration of the ladder diagram program is known, first, the original ladder diagram shown in FIG. 3 will be described as one example of the ladder diagram program in order to describe the concept for storing the ladder diagram program. Note that FIG. 3 is an example and the configuration of a ladder diagram is not limited thereto.

As shown in FIG. 3, the ladder diagram includes a left busbar (power rail) and a right busbar. Also, the ladder diagram includes circuit elements, horizontal connection lines, and a vertical connection line. The number of circuit elements, the number of horizontal connection lines, and the number of vertical connection lines are determined according to the content of control realized by the ladder diagram.

The circuit elements are arranged between the left busbar and the right busbar, and are connected to any of the other circuit elements, the left busbar, and the right busbar using the horizontal connection lines and the vertical connection line. The order of controls realized by the ladder diagram is determined according to these connections. Also, the type of circuit element is determined according to the shape of this circuit element.

For example, in FIG. 3, circuit elements (variables) var1 and var2 represent contact points, and a circuit element (variable) vary represents a coil. Also, a circuit element (variable) indicated by a rectangle represents a function or a function block, and represents a MOVE function in FIG. 3.

The left busbar side of the circuit element (variable) var1 is connected to the left busbar via a horizontal connection line, and the right busbar side of the circuit element (variable) var1 is connected to an EN terminal of the MOVE function via a horizontal connection line. An ENO terminal of the MOVE function is connected to the circuit element (variable) var5 via a horizontal connection line, and the right busbar side of the circuit element (variable) var5 is connected to the right busbar via a horizontal connection line.

The circuit element (variable) var2 is disposed below the circuit element (variable) var1. The left busbar side of the circuit element (variable) var2 is connected to the left busbar via a horizontal connection line, and the right busbar side of the circuit element (variable) var2 is connected to the vertical connection line via a horizontal connection line.

The vertical connection line is connected to the right busbar side of the circuit element (variable) var1 and the right busbar side of the circuit element (variable) var2 via the horizontal connection lines.

The circuit element (variable) var3 is connected to an In terminal of the function, and the circuit element (variable) var4 is connected to an Out terminal of the function.

Next, the concept for storing the ladder diagram program will be described with reference to FIG. 2. As shown in FIG. 2, with a method for storing the ladder diagram program according to the present embodiment, the left busbar, the right busbar, the circuit elements, the horizontal connection lines, and the vertical connection line of the ladder diagram are expressed using two-dimensional coordinates. Specifically, the horizontal direction of the ladder diagram is set to an X-axis direction, and the position of the left busbar in the ladder diagram is set to 0 (X=0). Also, X increases as the distance to the right busbar decreases. At this time, X is incremented each time a circuit element is detected.

Also, as shown in FIG. 2, the vertical direction of the ladder diagram is set to a Y-axis direction, the uppermost rung is set to 0 (Y=0), and Y is set to increment as the rung number increases.

Accordingly, as shown in FIG. 2, the coordinates of the circuit element (variable) var1 satisfy (X, Y)=(0, 0), the coordinates of the MOVE function satisfy (X, Y)=(1, 0), and the coordinates of the circuit element var5 satisfy (X, Y)=(2, 0). Also, the coordinates of the circuit element var2 satisfy (X, Y)=(0, 1).

Also, the coordinates of a position at which the vertical connection line is disposed on the two-dimensional coordinates are designated as the coordinates of the vertical connection line, and in FIG. 2, its coordinates satisfy (X, Y)=(1, 1).

Also, with the method for storing the ladder diagram program according to the present embodiment, the X-coordinate of the left busbar is defined as "0", and the name of a circuit element (variable) (var1 etc.) and the coordinates of this circuit element (variable) are stored in association with each other. Also, the type (contact point etc.) of a circuit element (variable) is stored in association with the name of the circuit element (variable) (var1 etc.) and the coordinates of this circuit element (variable).

Specifically, the ladder diagram shown in FIG. 3 has the data format shown in FIG. 4. As shown in FIG. 4, with the method for storing the ladder diagram program according to the present embodiment, the ladder diagram program is stored using text data, for example. As shown in FIG. 4, the names of the circuit elements (variables), the types of circuit elements (variables), and their coordinates are written as text data in association with each other.

Specifically, if the circuit element is a contact point or a coil, the name of the circuit element (variable), the type of circuit element (variable), and its coordinates are collectively written in one line.

For example,

<Contact Variable="var1" X=0, Y=0/> states that the circuit element (variable) is var1, the type of circuit element (variable) is a contact point, and its coordinates satisfy (X, Y)=(0, 0).

<Contact Variable="var2" X=0, Y=1/> states that the circuit element (variable) is var2, the type of circuit element (variable) is a contact point, and its coordinates satisfy (X, Y)=(0, 1).

<Contact Variable="var5" X=2, Y=0/> states that the circuit element (variable) is var2, the type of circuit element (variable) is a contact point, and its coordinates satisfy (X, Y)=(2, 0).

If the circuit element is a function or function block, the name and the coordinates of the function or function block are collectively written in one line, and the name of each terminal and objects connected to the terminals are written in the subsequent lines in order for each terminal.

For example,

<Function Name="MOVE" X=1, Y=0/22 states that the circuit element is a "MOVE" function, and its coordinates satisfy (X, Y)=(1, 0).

Also,

<PowerFlowParameterType="IN" Name="EN"/> states that a terminal connected to the horizontal connection line on the left busbar side of the function is an input terminal, and the name of this terminal is "EN".

<VariableParameterType="IN" Name="IN" Variable="var3"/> states that the function includes an input terminal for receiving an input from another circuit element (variable), its terminal name is "IN", and this input terminal is connected to the circuit element (variable) var3.

<PowerFlowParameterType="OUT" Name="ENO"/> states that a terminal connected to the horizontal connection line on the right busbar side of the function is an output terminal, and the name of this terminal is "ENO".

<VariableParameterType="OUT" Name="OUT" Variable="var4"/> states that the function includes an output terminal for outputting a signal to another circuit element (variable), its terminal name is "OUT", and this output terminal is connected to the circuit element (variable) var4.

In the case of the vertical connection line,

<Line X=1 Y=0/> states that the vertical connection line is disposed where the start point satisfies the coordinates (X, Y)=(1, 0).

Storing the ladder diagram program as text data in this manner makes it possible to further reduce the storage capacity than storing elements, as graphic elements, which were drawn as a ladder diagram in a conventional manner.

Also, as shown in FIG. 2, in the ladder diagram, the circuit elements are two-dimensionally arranged, referenced against the uppermost position of the left busbar, the circuit elements and their coordinates are stored in association with each other, and thus, it is possible to easily restore the ladder diagram program shown in FIG. 3 using the text data shown in FIG. 4.

Also, with the above-described method, the circuit elements (variables) connected to the function or function block are written as the elements that belong to the function or function block. This makes it possible to further reduce the data volume than separately detecting these circuit elements (variables), acquiring their two-dimensional coordinates, and providing individual rungs to these circuit elements (variables).

Figure 5:
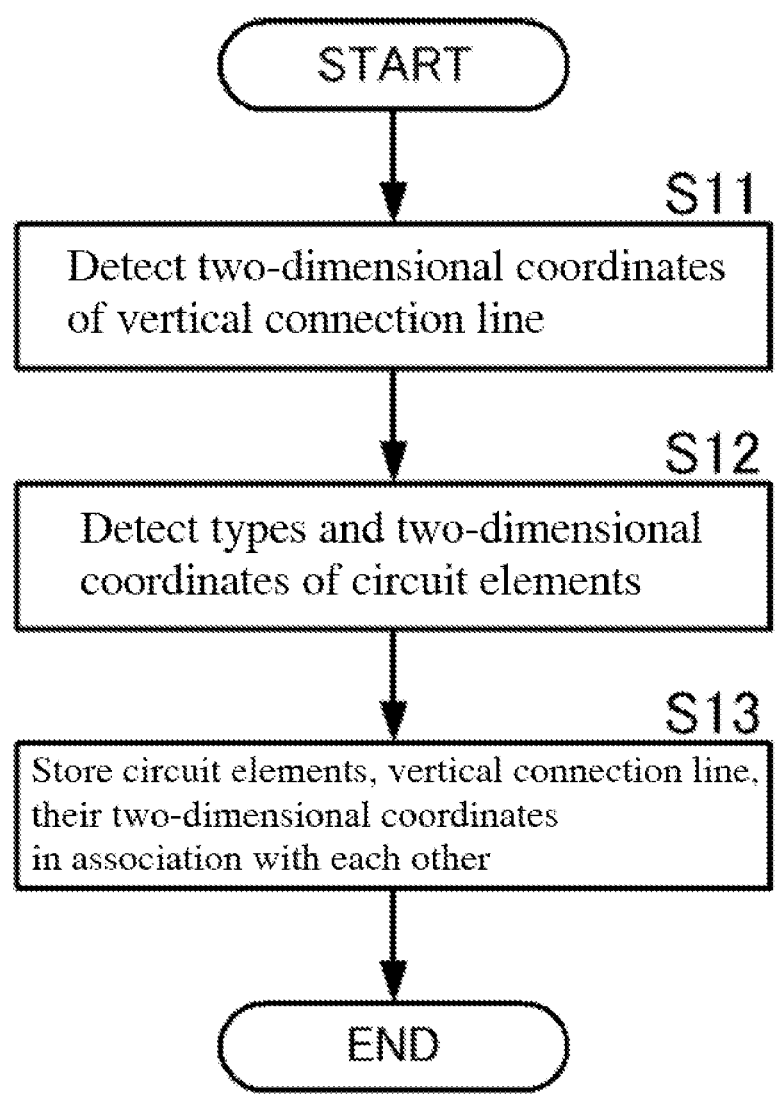
FIG. 5 is a flowchart showing a main flow of a method for storing a ladder diagram according to an embodiment of the present invention.

The flowchart shown in FIG. 5 illustrates the above-described processing. FIG. 5 is a flowchart showing the main flow of the method for storing a ladder diagram program according to an embodiment of the present invention.

As shown in FIG. 5, in step S11, the program development support unit 11 detects the vertical connection line and detects the two-dimensional coordinates of the vertical connection line from the edited ladder diagram program. When the ladder diagram program is edited, information indicating which portion of the ladder diagram is the vertical connection line is stored, and thus the vertical connection line may be detected using this information. As described above, the two-dimensional coordinates can be easily detected by setting the X-axis and the Y-axis where the uppermost position of the left busbar in the ladder diagram is the origin. At this time, similarly to the vertical connection line, the horizontal connection lines are also detected.

Next, in step S12, the program development support unit 11 detects the circuit elements (variables), and detects their types and two-dimensional coordinates. Similarly to the vertical connection line and the horizontal connection lines, when the ladder diagram program is edited, information indicating which portions of the ladder diagram are the circuit elements (variables) is stored and types of circuit elements (variables) are associated therewith, and thus the circuit elements (variables) and their types may be detected using this information. As described above, the two-dimensional coordinates can be easily detected by setting the X-axis and the Y-axis where the uppermost position of the left busbar in the ladder diagram is the origin.

Note that the order of the detection of the vertical connection line and the horizontal connection lines and the detection of the circuit elements (variables) is not limited to this order, and the vertical connection line, the horizontal connection lines, and the circuit elements (variables) may also be detected simultaneously (concurrently).

Next, in step S13, the program development support unit 11 stores the circuit elements (variables), the vertical connection line, and their two-dimensional coordinates in association with each other. At this time, as described above, the stored data is realized in a text data format with a small volume, for example. Accordingly, the ladder diagram program is stored with a small volume.

Figure 6:
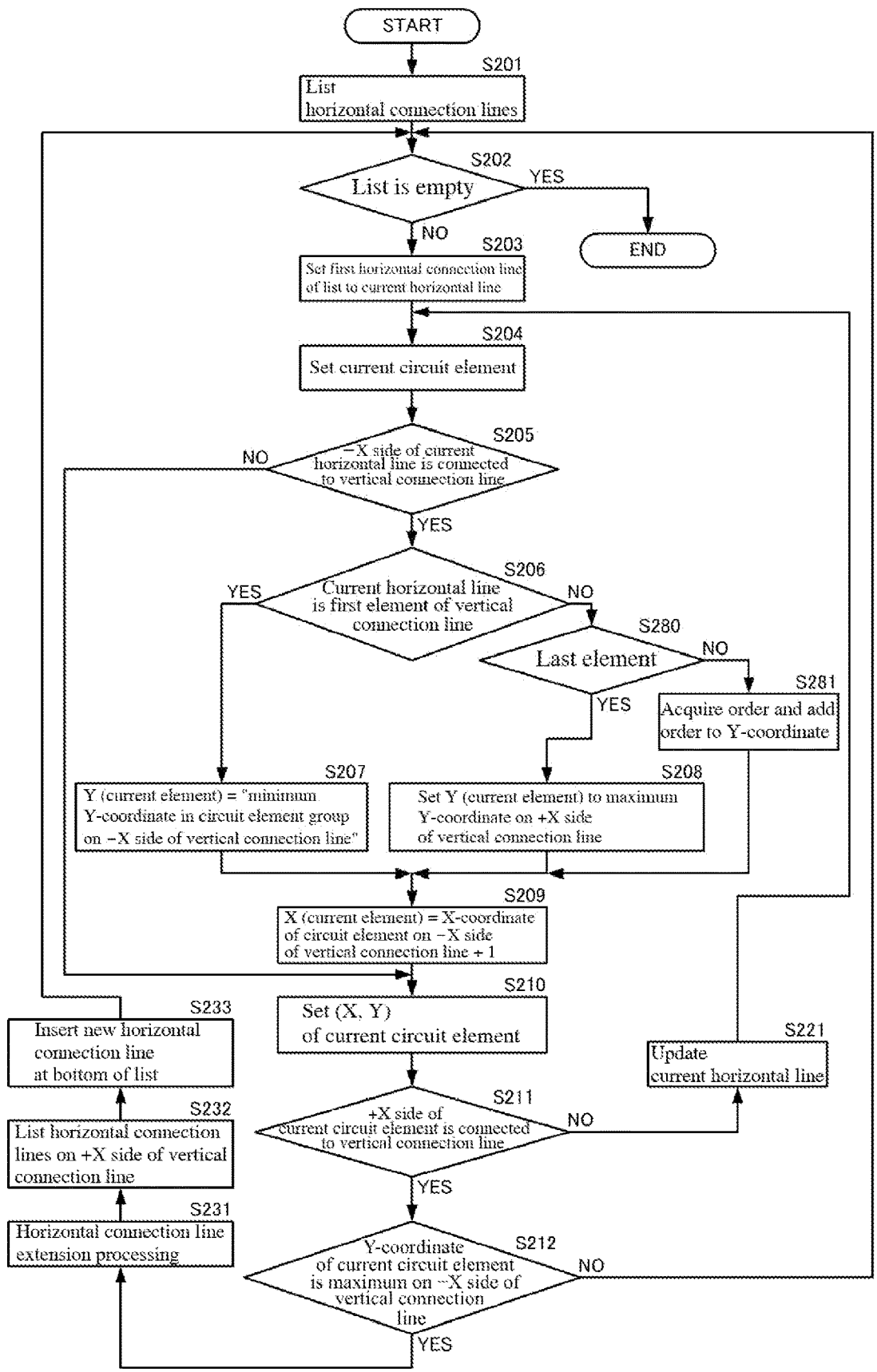
FIG. 6 is a more specific flowchart showing various detection processes for storing the ladder diagram program.

Next, a method for detecting the circuit elements (variables), their types, and their two-dimensional coordinates will be more specifically described. FIG. 6 is a more specific flowchart showing various detection processes for storing the ladder diagram program.

In step S201, the program development support unit 11 detects the horizontal connection lines in the ladder diagram and lists the detected horizontal connection lines. At this time, the program development support unit 11 lists the horizontal connection lines connected to the left busbar in order from the upper side to the lower side of the ladder diagram.

If the program development support unit 11 detects, in step S202, that the list of the horizontal connection lines is not empty (step S202: NO), the processing proceeds to step S203.

In step S203, the program development support unit 11 sets the first (leading) horizontal connection line of the list to the current horizontal line.

In step S204, the program development support unit 11 detects a circuit element connected to the right busbar side (+X side) of the current horizontal line, and sets the detected circuit element to the current circuit element.

If the program development support unit 11 detects, in step S205, that the left busbar side (−X side) of the current horizontal line is connected to the vertical connection line (step S205: YES), then the processing proceeds to step S206. On the other hand, if the program development support unit 11 detects that the left busbar side (−X side) of the current horizontal line is not connected to the vertical connection line (step S205: NO), then the processing proceeds to step S210.

In step S206, the program development support unit 11 detects whether or not the current horizontal line is the first element of the vertical connection line. If the program development support unit 11 detects that the current horizontal line is the first element of the vertical connection line (step S206: YES), then the processing proceeds to step S207. On the other hand, if the program development support unit 11 detects that the current horizontal line is not the first element of the vertical connection line (step S206: NO), then the processing proceeds to step S280.

In step S207, the program development support unit 11 sets Y (current element), which is the Y-coordinate of the current circuit element (variable), to the minimum Y-coordinate in a circuit element (variable) group on the −X side of the vertical connection line.

On the other hand, in step S280, the program development support unit 11 detects whether or not the current horizontal line is the last element of the vertical connection line. If the program development support unit 11 detects that the current horizontal line is the last element of the vertical connection line (step S280: YES), then the processing proceeds to step S208.

In step S208, the program development support unit 11 sets Y (current element) to the maximum Y-coordinate in a circuit element (variable) group on the +X side of the vertical connection line.

If the program development support unit 11 detects that the current horizontal line is not the last element of the vertical connection line (step S280: NO), then the program development support unit 11 acquires the order (ordinate number) of the current horizontal line from the top and adds the acquired order to the Y-coordinate. That is, the program development support unit 11 sets Y (current element), which is the Y-coordinate of the current circuit element (variable), to a value obtained by adding a value corresponding to the order (the value is the same number as the order if the top is 0, and the value is the number obtained by subtracting 1 from the order if the top is 1) to the minimum Y-coordinate in the circuit element (variable) group on the −X side of the vertical connection line (step S281).

The Y-coordinate of the circuit element (variable) whose left busbar side (−X side) is connected to the vertical connection line is determined through steps S207, S208, S280, and S281.

In step S209, the program development support unit 11 sets X (current element), which is the X-coordinate of the current circuit element (variable), to a value obtained by adding "1" to the X-coordinate of the circuit element (variable) on the left busbar side (−X side) of the vertical connection line. The X-coordinate of the circuit element (variable) whose left busbar side (−X side) is connected to the vertical connection line is determined in step S209.

In step S210, the program development support unit 11 sets the two-dimensional coordinates (X, Y) of the current circuit element (variable) whose left busbar side (−X side) is connected to the vertical connection line, to (X (current element), Y(current element)) that were determined in step S207 or step S208, and step S209. On the other hand, the program development support unit 11 sets the two-dimensional coordinates (X, Y) of the current circuit element (variable) whose left busbar side (−X side) is connected to the vertical connection line to a value obtained by adding "1" to the X-coordinate of a circuit element (variable) that is adjacent to the left busbar side (−X side) of the current circuit element (variable), and the Y-coordinate of the circuit element (variable) that is adjacent to the left busbar side (−X side) of the current circuit element (variable).

In step S211, the program development support unit 11 detects whether or not the right busbar side (+X side) of the current circuit element (variable) is connected to the vertical connection line. If the program development support unit 11 detects that the right busbar side (+X side) of the current circuit element (variable) is connected to the vertical connection line (step S211: YES), then the processing proceeds to step S212. If the program development support unit 11 detects that the right busbar side (+X side) of the current circuit element (variable) is not connected to the vertical connection line (step S211: NO), then the processing proceeds to step S221.

In step S212, if the program development support unit 11 detects that the current circuit element (variable) is located on the left busbar side (−X side) of the vertical connection line, and its Y-coordinate is the maximum among the circuit element (variable) group whose left busbar side (−X side) is connected to this vertical connection line (step S212: YES), then the processing proceeds to step S231. On the other hand, if the program development support unit 11 detects that the current circuit element (variable) is located on the left busbar side (−X side) of the vertical connection line, and its Y-coordinate is not the maximum among the circuit element (variable) group whose left busbar side (−X side) is connected to this vertical connection line (step S212: NO), then the processing proceeds to step S202.

The program development support unit 11 updates the current horizontal line in step S221. Specifically, the program development support unit 11 sets the horizontal connection line on the right busbar side (+X side) of the current circuit element (variable) to a new current horizontal line. If the program development support unit 11 inserts a new horizontal line at the bottom of the list and updates the current horizontal line (step S233), the processing returns to step S204.

The program development support unit 11 performs horizontal connection line extension processing in step S231, and the processing proceeds to step S232. The program development support unit 11 lists horizontal connection lines on the right busbar side (+X side) of the vertical connection line in step S232, and the processing proceeds to step S202.

If the above-described processing is repeated and the program development support unit 11 detects that the list is empty (step S202: YES), the processing ends.

Performing such processing makes it possible to reliably detect two-dimensional coordinates of the circuit elements (variables).

Figure 7:
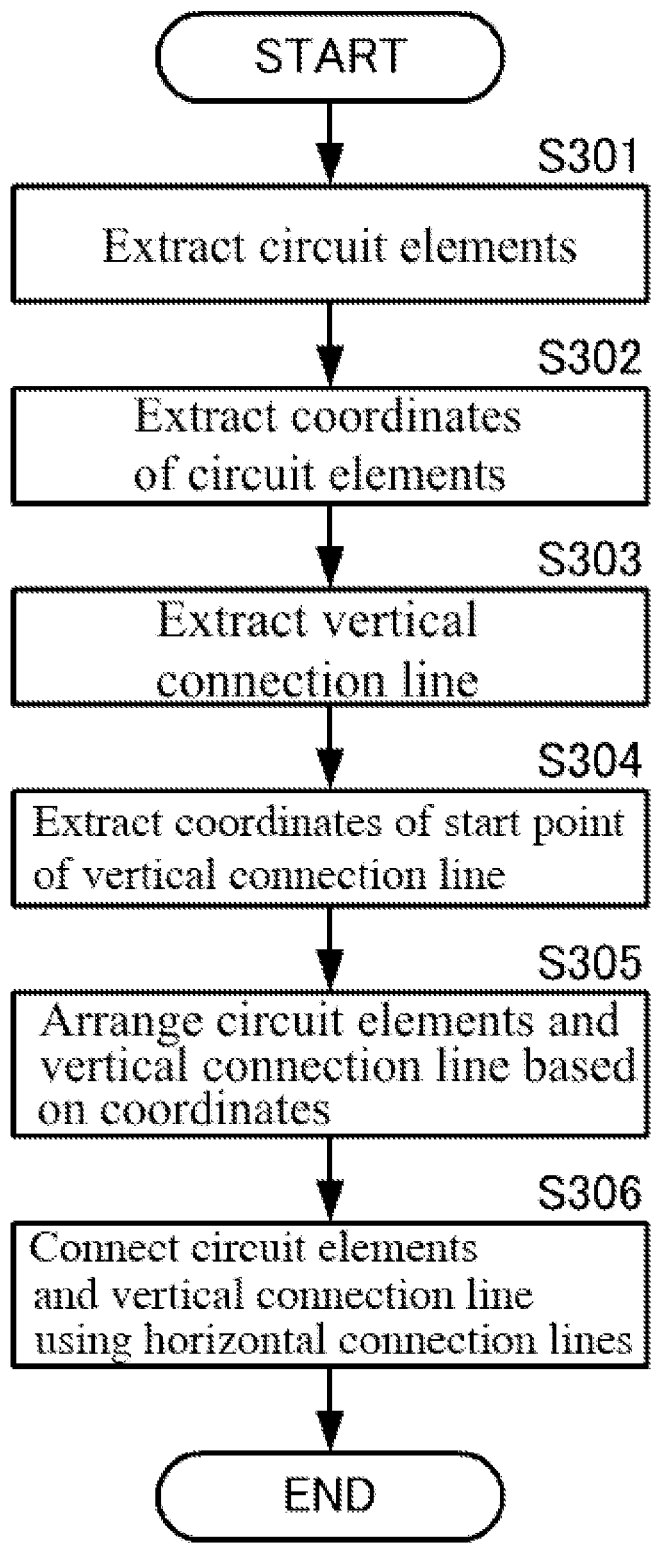
FIG. 7 is a flowchart of a method for restoring a ladder diagram according to an embodiment of the present invention.

The stored ladder diagram program is restored using the following method, for example. FIG. 7 is a flowchart of a method for restoring a ladder diagram according to an embodiment of the present invention.

The program development support unit 11 extracts circuit elements from the stored ladder diagram program (step S301). The program development support unit 11 then extracts coordinates associated with the extracted circuit elements (step S302).

The program development support unit 11 extracts a vertical connection line from the stored ladder diagram program (step S303). The program development support unit 11 extracts coordinates associated with the extracted vertical connection line (step S304). Note that the order of extraction of the circuit elements and extraction of the vertical connection line are not limited to this order.

The program development support unit 11 arranges the circuit elements and the vertical connection line based on the extracted coordinates (step S305). More specifically, the program development support unit 11 sets the coordinates of an upper end of the left busbar in the ladder diagram to (X, Y)=(0, 0). The X-coordinate of the right busbar is determined by an X-coordinate obtained by adding 1 to the maximum X-coordinate of all of the circuit elements. The program development support unit 11 arrange the circuit elements and the vertical connection line at positions with the corresponding coordinates while adding the X-coordinate from the left busbar toward the right busbar where the horizontal axis is the X-axis, and adding the Y-coordinate downward where the vertical axis is the Y-axis. At this time, the program development support unit 11 disposes a figure corresponding to the type of circuit element, and disposes a set variable accompanied by this figure. Furthermore, if a circuit element is a function or function block, the program development support unit 11 also disposes a variable of an object connected to each terminal, for example.

The program development support unit 11 connects the circuit elements and the vertical connection line using the horizontal connection lines based on the coordinates of the circuit elements and the vertical connection line (step S306).

Performing such processing makes it possible to easily and accurately restore a ladder diagram program.

INDEX TO THE REFERENCE NUMERALS

10 Personal computer
11 Program development support unit
12 Operation input unit
13 Communication controller
14 Display unit
21 Ladder diagram editing program
111 Arithmetic unit
112 Storage unit
120 Ladder diagram storage unit

The invention claimed is:

1. A program development support apparatus comprising:
a memory storing a ladder diagram editing program and an edited ladder diagram program; and
an arithmetic unit configured to execute the ladder diagram editing program to edit the ladder diagram program, and store the ladder diagram program in the memory, wherein
the arithmetic unit is configured to perform operations comprising:
allocating two-dimensional coordinates to a ladder diagram expressed by the ladder diagram program,
detecting vertical connection lines, two-dimensional coordinates of the vertical connection lines, circuit elements, two-dimensional coordinates of the circuit elements, and types of the circuit elements included in the ladder diagram, by, for each vertical connection line:
detecting horizontal connection lines between a minimum Y-coordinate and a maximum Y-coordinate of the vertical connection line; and
for each of the detected horizontal connection lines, incrementing an X-coordinate to detect the circuit elements located on the horizontal connection line; and
storing the circuit elements, the detected vertical connection lines, the two-dimensional coordinates of the circuit elements, and the two-dimensional coordinates of the detected vertical connection lines in the memory in association with each other.

2. The program development support apparatus according to claim 1, wherein
the arithmetic unit is configured to perform operations such that storing comprises storing the circuit elements, the vertical connection lines, the two-dimensional coordinates of the circuit elements, and the two-dimensional coordinates of the vertical connection lines as text data in the memory in association with each other, and in response to the arithmetic unit detecting that a circuit element comprises a function or function block, the arithmetic unit is configured to perform operations comprising storing, as text data, any circuit element that is connected to the function or function block together with a connection relationship of that circuit element to the function or function block.

3. The program development support apparatus according to claim 2, wherein the arithmetic unit is configured to perform operations further comprising:
reading out, from the memory, the circuit elements, the two-dimensional coordinates of circuit elements, the detected vertical connection lines, and the two-dimensional coordinates of the detected vertical connection lines that are stored,
arranging the circuit elements and the vertical connection lines that have been read out, based on the two-dimensional coordinates, taking an upper end of a left busbar of the ladder diagram as a reference, and
restoring the ladder diagram by connecting the left busbar, a right busbar, the circuit elements, and the detected vertical connection lines using horizontal connection lines.

4. The program development support apparatus according to claim 1, wherein the arithmetic unit is configured to perform operations further comprising:
reading out, from the memory, the circuit elements, two-dimensional coordinates of circuit elements, the detected vertical connection lines, and the two-dimensional coordinates of the detected vertical connection lines that are stored,
arranging the circuit elements and the detected vertical connection lines that have been read out, based on the two-dimensional coordinates, taking an upper end of a left busbar of the ladder diagram as a reference, and
restoring the ladder diagram by connecting the left busbar, a right busbar, the circuit elements, and the detected vertical connection lines using horizontal connection lines.

5. The program development support apparatus according to claim 1, wherein the minimum Y-coordinate comprises a Y-coordinate of a first circuit element on the vertical connection line, and the maximum Y-coordinate comprises a Y-coordinate of a last circuit element on the vertical connection line.

6. The program development support apparatus according to claim 1, wherein the arithmetic unit is configured to perform operations such that storing further comprises:
storing the circuit elements, the vertical connection lines, the two-dimensional coordinates of the circuit elements, and the two-dimensional coordinates of the vertical connection lines as text data in the memory in association with each other, and
storing names of the circuit elements, types of the circuit elements, and two-dimensional coordinates of the circuit elements as text data in the memory in association with each other.

7. A program development support method for editing a ladder diagram program and storing an edited ladder diagram program, the method comprising:
allocating two-dimensional coordinates to a ladder diagram expressed by the ladder diagram program;
detecting vertical connection lines, two-dimensional coordinates of detected vertical connection lines, circuit elements, two-dimensional coordinates of circuit elements, and types of circuit elements included in the ladder diagram, by for each vertical connection line:

detecting horizontal connection lines between a minimum Y-coordinate and a maximum Y-coordinate of the vertical connection line; and for each of the detected horizontal connection lines, incrementing an X-coordinate to detect the circuit elements located on the horizontal connection line; and storing the circuit elements, the detected vertical connection lines, the two-dimensional coordinates of the circuit elements, and the two-dimensional coordinates of the detected vertical connection lines in association with each other.

8. A non-transitory computer-readable storage medium storing a program development support program, which when read and executed for causing a computer to execute processing for editing a ladder diagram program and storing an edited ladder diagram program, the program causing the computer to perform operations comprising:

allocating two-dimensional coordinates to a ladder diagram expressed by the ladder diagram program;

detecting vertical connection lines, two-dimensional coordinates of the detected vertical connection lines, circuit elements, two-dimensional coordinates of circuit elements, and types of circuit elements included in the ladder diagram, by for each vertical connection line:

detecting horizontal connection lines between a minimum Y-coordinate and a maximum Y-coordinate of the vertical connection line; and for each of the detected horizontal connection lines, incrementing an X-coordinate to detect the circuit elements located on the horizontal connection line; and storing the circuit elements, the detected vertical connection lines, the two-dimensional coordinates of the circuit elements, and the two-dimensional coordinates of the detected vertical connection lines in association with each other.

* * * * *